(12) United States Patent
Belair

(10) Patent No.: US 6,212,613 B1
(45) Date of Patent: Apr. 3, 2001

(54) METHODS AND APPARATUS FOR REUSING ADDRESSES IN A COMPUTER

(75) Inventor: Stephen P. Belair, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/273,925

(22) Filed: Mar. 22, 1999

(51) Int. Cl.[7] .................................................. G06F 12/10

(52) U.S. Cl. ............................................................ 711/207

(58) Field of Search ..................................... 711/207, 206

(56) References Cited

U.S. PATENT DOCUMENTS 4,376,297 * 3/1983 Anderson et al. .................... 711/207
5,924,127 * 7/1999 Kawamoto et al. .................. 711/207

* cited by examiner

Primary Examiner—David L. Robertson
(74) Attorney, Agent, or Firm—Chapin & Huang, L.L.C.; David E. Huang

(57) ABSTRACT

A technique reuses addresses in a computer that includes a memory and a translation lookaside buffer having entries for storing address mappings for address translation. The technique involves selecting an address range from a set of address ranges in response to a request to allocate a portion of the memory of the computer, and to generate an address mapping which maps that address range to the portion of the memory. The technique further involves accessing at least one but less than all of the entries of the translation lookaside buffer in response to the request, and later deallocating the portion of the memory. The steps of selecting, accessing and deallocating are repeated such that, when a repeated step of selecting selects a previously selected address range, previous successive steps of accessing ensure that any address mapping, which maps that previously selected address range and which resides in an entry of the translation lookaside buffer, is unavailable for a subsequent address translation.

20 Claims, 8 Drawing Sheets

METHODS AND APPARATUS FOR REUSING ADDRESSES IN A COMPUTER

BACKGROUND OF THE INVENTION

A typical computer provides a virtual addressing environment to the computer's operating system and other running programs. In general, the computer forms such an environment by generating and maintaining a set of address mappings that map virtual addresses ranges to physical addresses ranges (e.g., 4 kilobyte pages), and using the set of address mappings to translate virtual addresses into physical addresses. Virtual addresses are abstractions that the running programs perceive as actual addresses of the computer's memory. Physical addresses are the actual addresses of the computer's memory.

In general, the computer implements the virtual addressing environment using what are commonly known as "page tables" and a "translation lookaside buffer" (TLB). The page tables are large data structures in memory which store the entire set of address mappings. The TLB (or memory management unit) is a special cache having TLB entries which temporarily store often-used address mappings from the page tables. This cache is typically built into the computer's processor to provide the processor with quicker access to the address mappings than that provided by the page tables.

Typically, each TLB entry includes a valid bit. If the valid bit of a TLB entry is set (e.g., equals "1"), that TLB entry is usable by the computer for address translation. However, if the valid bit of a TLB entry is cleared (e.g., equals zero), that TLB entry is not usable for address translation.

In general, when a program accesses memory using a particular virtual address, the computer checks valid TLB entries for an address mapping that maps a virtual address range covering the particular virtual address. If the computer finds such a mapping in a valid TLB entry, the computer translates the particular virtual address into a physical address using that mapping, and then accesses the memory according to the translated physical address. However, if the computer does not find such a mapping in a valid TLB entry, a TLB exception is said to have occurred. The computer handles the TLB exception by transferring a copy of the address mapping that maps the virtual address range covering the particular address from the page tables to an entry of the TLB, and validates that entry. Then, in the manner described above, the computer translates the particular virtual address into the physical address using the address mapping from the valid TLB entry, and accesses the computer's memory according to the physical address.

When a running program gives up or "frees" a previously allocated memory space that it will no longer use, any valid TLB entries, which store address mappings for translating virtual addresses to that memory space, are said to become "stale". A stale TLB entry is a valid TLB entry that stores an old address mapping that is no longer correct.

Typically, a computer does not invalidate stale TLB entries in response to a running program freeing memory space. Rather, the computer allows the stale TLB entries to remain in the TLB for a short time so that it can deal with the stale TLB entries in a more routine manner.

However, the computer must then respond immediately to some situations by operating on the TLB to avoid inadvertently using stale TLB entries to translate addresses. In particular, the computer must respond immediately to dynamic mapping operations (e.g., a memory allocation request by a running program) as will be made clearer by the following dynamic mapping example.

Suppose that a running program routinely reuses the same virtual address to access multiple memory spaces at different times. That is, the running program issues a first memory allocation request. The computer responds by allocating a memory space which the running program can access using a particular virtual address, and by further storing, in the page tables, an address mapping that maps a virtual address range covering the particular virtual address to the appropriate physical address range for the memory space. When the program attempts to access the memory space using the particular virtual address, a TLB exception occurs causing the computer to transfer the address mapping from the page tables to an entry of the TLB, validate that entry, and then use the valid TLB entry to translate the particular virtual address into the proper physical address to access the memory space.

When the running program subsequently frees the memory space, the computer allows the now stale TLB entry storing the address mapping to remain unchanged in the TLB. That is, the stale TLB entry remains valid.

Now, suppose that the running program issues a second memory allocation request which it plans to access using the same particular virtual address. The computer responds by allocating a new memory space to the running program, and by further storing, in the page tables, a new address mapping that maps the same particular virtual address range covering the particular virtual address to the appropriate physical address range for the new memory space. At this point, the computer must also invalidate the stale TLB entry which stores the original address mapping. Otherwise, when the running program attempts to access the new memory space using the same particular address, a TLB exception will not occur, and the computer will not transfer the new address mapping from the page tables into an entry of the TLB for address translation. Rather, the computer will translate the particular virtual address using the stale TLB entry and the running program will access the original (and now freed) memory space resulting in incorrect operation.

Computers use various approaches to prevent stale TLB entries from causing improper address translations when responding to dynamic memory allocation requests. In general, conventional approaches involve accessing each of the entries within the TLB in response to a dynamic mapping request. Two common approaches are described below.

In one approach (hereinafter called the "blanket approach"), the computer invalidates each entry within the TLB in response to a dynamic mapping request from a running program. Since the computer invalidates each TLB entry, there are no usable TLB entries remaining in the TLB for address translation. Accordingly, improper address translation using a stale and incorrect TLB entry is prevented. For a TLB having N TLB entries, the blanket approach requires N TLB accesses, one access to invalidate each TLB entry.

In another approach (hereinafter called the "check-first approach"), the computer checks each TLB entry in response to a dynamic mapping request. If a TLB entry stores an address mapping that maps a virtual address range covering the virtual address provided by the dynamic mapping request, the computer invalidates that TLB entry. Otherwise, the computer leaves that TLB entry unchanged. If there are no entries in the TLB that store an address mapping which maps the same virtual address range, there are at most N TLB accesses (each TLB entry being accessed to obtain its stored address mapping). On the other hand, when such a stale TLB entry exists, more than N TLB accesses will be required.

It may seem that the blanket approach is superior to the check-first approach because check-first approach may require more TLB accesses. However, in some situations, the check-first approach may provide superior performance than the blanket approach since the check-first approach invalidates TLB entries only when necessary. Accordingly, there may be a tendency for the check-first approach to generate less TLB exceptions resulting in less TLB accesses overall and better performance than the blanket approach.

SUMMARY OF THE INVENTION

In contrast to conventional approaches for reusing addresses which access each entry of a translation lookaside buffer (TLB) when responding to a dynamic mapping request, the invention is directed to techniques for reusing addresses that involve accessing at least one entry of the TLB, but less than all of the entries of the TLB when responding to a dynamic mapping request. Accordingly, the invention requires less TLB accesses and provides better performance than the conventional approaches that access each entry of the TLB in response to such a dynamic mapping request. Such operating features are particularly desirable in the context of data communications devices which strive to maximize throughput or bandwidth with operations having low complexity.

One embodiment of the invention is directed to a method for reusing addresses in a computer that includes a memory and a TLB having entries for storing address mappings for address translation. The method includes a step of selecting an address range from a set of address ranges in response to a request to allocate a portion of the memory of the computer, and to generate an address mapping which maps that address range to the portion of the memory. Preferably, the address range is selected from a shadow translation table maintained in a shadow memory by a mapping circuit. Additionally, the method includes a step of accessing at least one but less than all of the entries of the TLB in response to the request. Furthermore, the method includes a step of deallocating the portion of the memory. The method further includes the step of successively repeating the steps of selecting, accessing and deallocating such that, when a repeated step of selecting selects a previously selected address range, previous successive steps of accessing ensure that any address mapping, which maps that previously selected address range and which resides in an entry of the TLB, is unavailable for a subsequent address translation.

Preferably, the step of accessing includes the step of invalidating exactly one entry of the TLB in response to the request. In this situation, the method may further include, after the step of selecting the address range from the set of address ranges in response to the request, the steps of (a) generating the address mapping which maps that address range to the portion of the memory; and (b) transferring the generated address mapping into an entry of the TLB in response to an exception condition. Alternatively, the step of invalidating includes the step of transferring, in response to the request, an address mapping into the entry of the TLB such that that entry is invalidated.

As an alternative to the step of accessing including the step of invalidating exactly one entry of the TLB in response to the request, the step of accessing may include the steps of (a) checking exactly one entry of the TLB to determine whether that entry includes an address mapping that maps the address range selected by the step of selecting; and (b) invalidating that entry when it includes the address mapping that maps the address range selected by the step of selecting, and otherwise leaving that entry unchanged.

Preferably, the step of successively repeating includes the step of successively accessing the entries of the TLB in a predetermined order. In particular, the step of successively accessing preferably includes the step of indexing the entries of the TLB based on a content of a TLB counter that changes incrementally for each successive access.

Furthermore, the step of successively repeating preferably includes the step of successively selecting the address ranges from the set of address ranges in a predetermined order. In particular, the step of successively selecting preferably includes the step of choosing the address ranges from the set of address ranges in a shadow translation table based on a content of a shadow counter that changes incrementally for each successive choice.

Preferably, the method further includes the step of establishing the address ranges as a pre-defined set of virtual address ranges before the step of selecting.

A second embodiment is directed to a computer system that includes a memory, a TLB having entries that store address mappings for address translation, and a mapping circuit. The mapping circuit is coupled to the memory and the TLB. The mapping circuit performs a select operation that selects an address range from a set of address ranges in response to a request to allocate a portion of the memory of the computer, and to generate an address mapping which maps that address range to the portion of the memory. Preferably, the set of address ranges are virtual address ranges which are maintained in a shadow translation table of a shadow memory. Additionally, the mapping circuit performs an access operation that accesses at least one, but less than all, of the entries of the TLB in response to the request. Furthermore, the mapping circuit performs a deallocate operation that deallocates the portion of the memory. The mapping circuit successively repeats the select, access and deallocate operations such that, when a repeated select operation selects a previously selected address range, previous successive access operations ensure that any address mapping, which maps that previously selected address range and which resides in an entry of the TLB, is unavailable for a subsequent address translation.

Preferably, the mapping circuit includes a control circuit that invalidates exactly one entry of the TLB in response to the request. In this situation, the control circuit includes circuitry that, after the select operation selects the address range from the set of address ranges in response to the request, (a) generates the address mapping which maps that address range to the portion of the memory, and (b) transfers the generated address mapping into an entry of the TLB in response to an exception condition. Alternatively, the control circuit includes circuitry that, in response to the request, transfers an address mapping into the entry of the TLB such that that entry is invalidated.

As an alternative to the mapping circuit including a control circuit that invalidates exactly one entry of the TLB in response to the request, the mapping circuit includes a control circuit that (a) checks exactly one entry of the TLB to determine whether that entry includes an address mapping that maps the address range selected by the select operation, and (b) invalidates that entry when that entry includes the address mapping that maps the address range selected by the select operation, and otherwise leaves that entry unchanged.

In one version of the second embodiment, the mapping circuit includes a TLB counter that provides indexes that change incrementally, and a control circuit which is coupled to the TLB counter. The control circuit successively repeats the select, access and deallocate operations to successively access the entries of the TLB in a predetermined order according to the indexes provided by the translation lookaside counter.

In another version of the second embodiment, the mapping circuit includes a shadow counter that provides indexes that change incrementally, and a control circuit which is coupled to the shadow counter. Here, the control circuit successively repeats the select, access and deallocate operations to successively select the address ranges from the set of address ranges in a predetermined order according to the indexes provided by the shadow counter.

A third embodiment of the invention is directed to a computer program product that includes a computer readable medium having instructions stored thereon for reusing addresses in a computer. The computer has a memory and a TLB having entries for storing address mappings for address translation. The instructions, when processed by the computer, cause the computer to perform the step selecting an address range from a set of address ranges in response to a request to allocate a portion of the memory of the computer, and to generate an address mapping which maps that address range to the portion of the memory. Additionally, the instructions cause the computer to perform the step of accessing at least one but less than all of the entries of the TLB in response to the request. Furthermore, the instructions cause the computer to perform the step of deallocating the portion of the memory. Also, the instructions cause the computer to perform the step of successively repeating the steps of selecting, accessing and deallocating such that, when a repeated step of selecting selects a previously selected address range, previous successive steps of accessing ensure that any address mapping, which maps that previously selected address range and which resides in an entry of the TLB, is unavailable for a subsequent address translation.

Preferably, the instructions, which cause the computer to perform the step of accessing, more particularly cause the computer to perform the step of invalidating exactly one entry of the TLB in response to the request.

It should be understood that each embodiment of the invention accesses less than all of the entries of the TLB when responding to a dynamic mapping request. Accordingly, such embodiments are less demanding on the TLB than conventional approaches that access each TLB entry when responding to a dynamic mapping request. That is, for the invention, the TLB maintenance operations involved in responding to a dynamic mapping request are simpler and faster. Furthermore, the invention ensures proper address translation by preventing the stale entries from being used to translate virtual addresses into physical addresses.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
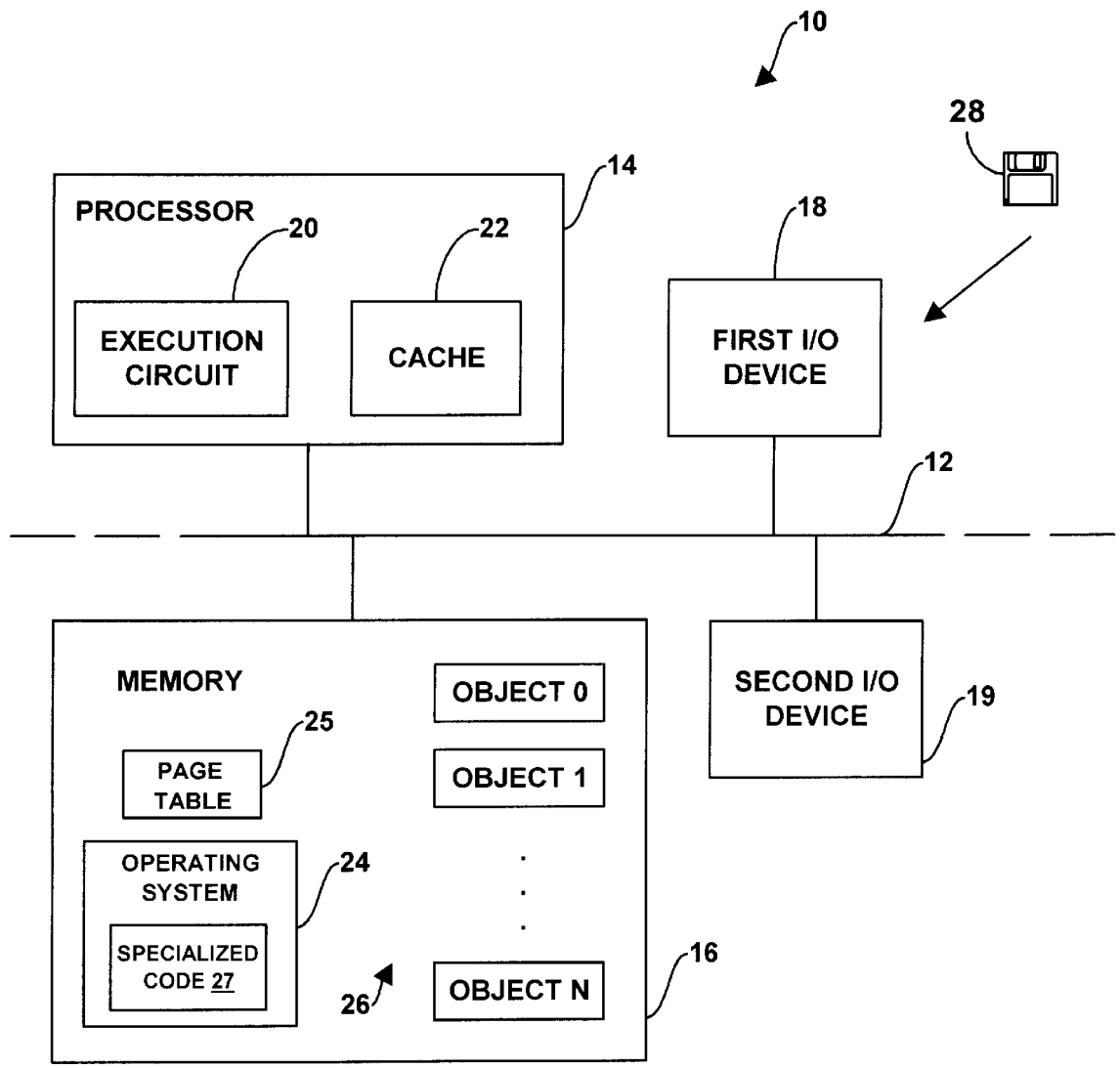
FIG. 1 is a block diagram illustrating a general purpose computer that is suitable for use by an embodiment of the invention.

The invention is directed to techniques for reusing addresses in a computer having a translation lookaside buffer (TLB). The techniques involve accessing at least one entry of the TLB, but less than all of the entries of the TLB when responding to a dynamic mapping request. FIG. 1 shows a general purpose computer 10 that is suitable for use by the invention. The computer 10 has a computer bus 12, and multiple devices including a processor 14, memory 16, a first I/O device 18, and a second I/O device 19. The multiple devices communicate with each other by passing electrical signals through electrical connections of the bus 12.

The processor 14 includes an execution circuit 20 and a high speed cache 22. The execution circuit 20 is preferably a pipelined processor which is formed by multiple execution units (e.g., integer and floating point units). The high speed cache 22 provides relatively quicker data access than the memory 16.

The memory 16 includes both primary memory (e.g., semiconductor memory such as DRAMs) and relatively slower secondary memory (e.g., magnetic memory such as magnetic disks). The memory 16 stores an operating system 24, page tables 25 and memory objects 26 (e.g., OBJECT 0, OBJECT 1, . . . , OBJECT N). The operating system 24 includes specialized code 27 configured according to the embodiments of the invention. Preferably, the first I/O device 18 loads the specialized code 27 from a computer program product 28 (e.g., a computer readable 28 such as one or more floppy diskettes) into the memory 16 (e.g., a floppy disk drive).

Figure 2:
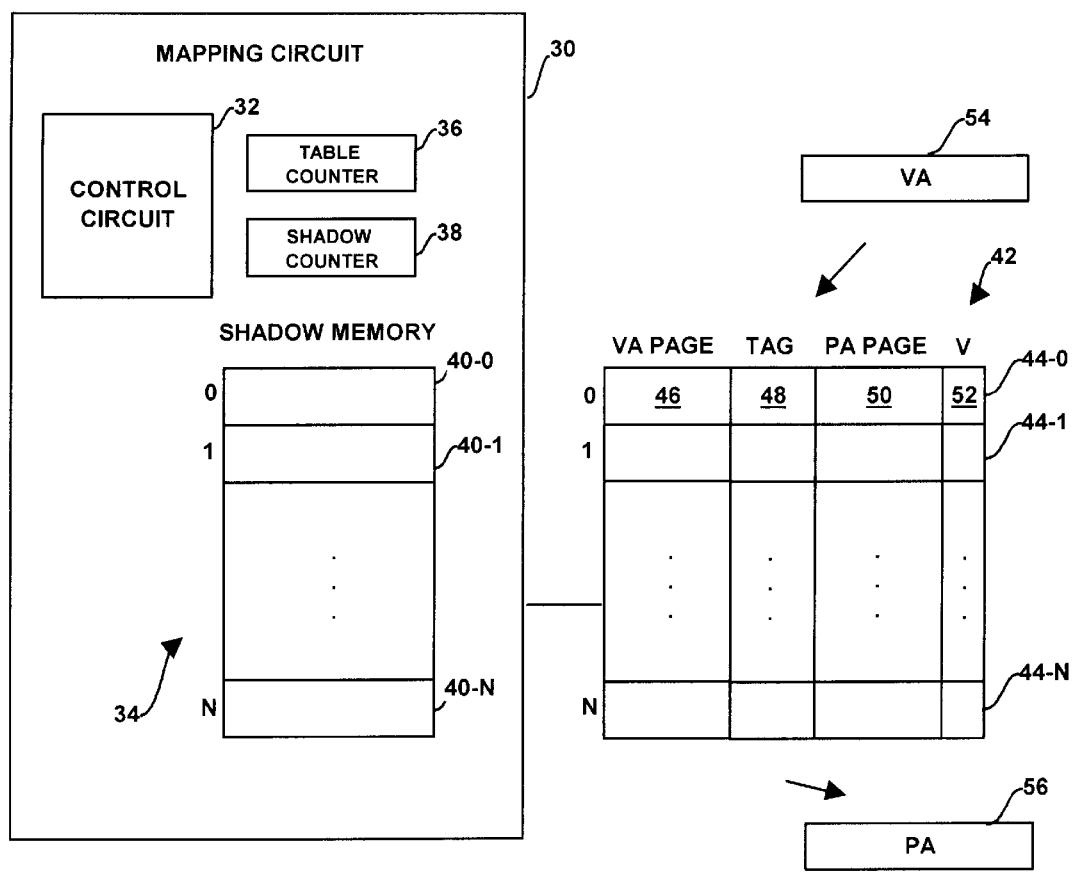
FIG. 2 is a block diagram illustrating particular circuits of the computer of FIG. 1.

As shown in FIG. 2, when the specialized code 27 of the operating system 24 runs on the computer 10, the processor 14 operates as a mapping circuit 30, and a portion of the cache 22 operates as a TLB 42. As such, the mapping circuit 30 includes a control circuit 32, a shadow memory 34, a table counter 36, and a shadow counter 38. Preferably, the execution circuit 20 (FIG. 1), when executing the specialized code 27 of the operating system 24, forms the control circuit 32. Additionally, dedicated memory locations (e.g., a portion of the cache 22 not allocated to the TLB 42) preferably form the shadow memory 34. Furthermore, processor registers (e.g., general purpose registers) preferably form the table and shadow counters 36,38.

The shadow memory 34 includes a shadow translation table having multiple shadow memory entries 40-0, 40-1, . . . , 40-N (collectively 40) for storing a set of non-overlapping, predetermined virtual address ranges. The TLB 42 includes multiple TLB entries 44-0, 44-1, . . . 44-N (collectively 44). The shadow memory 34 and the TLB 42 preferably have the same number of entries N (a positive integer such as 48) such that each of the shadow entries 40 of the shadow memory 34 corresponds with one of the TLB entries 44 of the TLB 42 (thus meriting the term "shadow" for the various above-described devices).

Each TLB entry 44 includes a virtual address range field 46, a tag field 48, a physical address range field 50 and a valid field 52. Each TLB entry 44 maps a virtual address range stored in its virtual address range field 46 to a physical address range stored in its physical address range field 50. Preferably, the virtual address ranges are non-overlapping, equally sized memory ranges which allocate, for example, contiguous four megabyte (4 MB) ranges of main memory. The tag field 48 identifies a particular process running on the computer 10 to which the virtual address range in the virtual address range field 46 is allocated. The valid field 52 of a TLB entry 44 indicates whether that TLB entry is valid or invalid. Only valid TLB entries 44 (e.g., TLB entries having a valid field 52 that stores a non-zero value) can be used for translating a virtual address into a physical address. That is, the mapping circuit 30 does not use invalid TLB entries 44 for translating a virtual address into a physical address.

Figure 3:
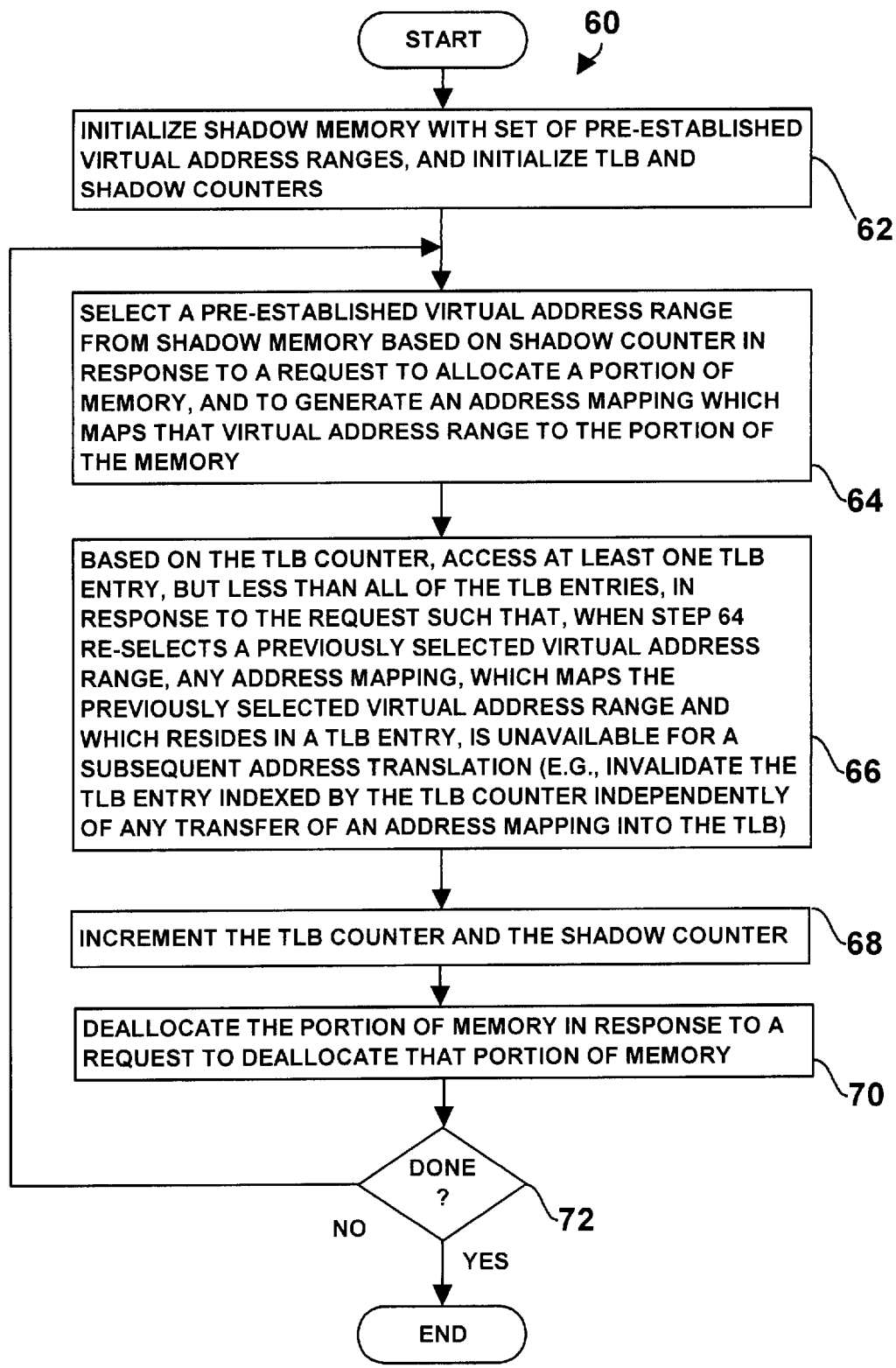
FIG. 3 is a flow chart describing the operation of the particular circuits of FIG. 2.

Further details of the operation of the mapping circuit 30 (i.e., the processor 14 running the specialized code 27 of the operating system 24) will now be provided with reference to FIG. 3. Over time, the mapping circuit 30 performs operations that translate virtual addresses to physical addresses using the TLB 42, and that maintain consistency within the TLB 42 to ensure that such address translations are not used incorrectly. FIG. 3 shows a procedure 60 illustrating such operations in the context of responding to dynamic mapping requests.

In step 62, the mapping circuit 30 initializes entries of the shadow memory 34 with a set of non-overlapping, pre-established virtual address ranges. Additionally, the mapping circuit 30 initializes the TLB counter 36 and shadow counter 38 to predetermined values (e.g., zero). Each pre-established virtual address range preferably is an equally sized range such as a 4 MB range. Preferably, the mapping circuit 30 performs step 62 as part of the computer start-up procedure (e.g., when the computer 10 is initially powered-up or reset).

Additionally, in step 62, the mapping circuit 30 further initializes the TLB counter 36 to reference or index an entry of the TLB 42. Similarly, the mapping circuit 30 initializes the shadow counter 38 to index an entry of the shadow memory 34.

In step 64, the mapping circuit 30 selects one of the virtual address ranges from the shadow memory 34 based on the shadow counter 38 in response to a request to allocate a portion of the memory 16 of the computer 10 (e.g., in response to a "malloc( )" instruction) from a running program (e.g., the operating system 24 itself). In particular, the mapping circuit 30 uses the contents of the shadow counter 38 as an index to the entries of the shadow memory 34 when selecting a virtual address range.

Additionally, in response to the memory allocation request, the mapping circuit 30 allocates a portion of the memory 16, and generates, in the page tables 25, an address mapping which maps that address range to the portion of the memory 16. Accordingly, the running program, which requested the portion of the memory 16, can use the generated address mapping to access the portion of the memory 16 using virtual addresses.

In step 66, still in response to the allocation request, the mapping circuit 30 accesses at least one TLB entry, but less than all of the TLB entries based on the TLB counter 36. In a first embodiment, the mapping circuit 30 invalidates exactly one entry 44 of the TLB 42 using the contents of the TLB counter 36 as an index to the select the TLB entry to invalidate.

In step 68, the mapping circuit 30 increments the TLB counter 36 and the shadow counter 38. Accordingly, the shadow counter 38 now indexes the next adjacent entry 40 of the shadow memory 34, and the TLB counter 36 now indexes the next adjacent TLB entry 44. The mapping circuit 30 resets the TLB counter 36 and the shadow counter 38 when incrementing them would cause their contents to exceed the bounds of the TLB 42 and the shadow memory 34, respectively. For example, if there are N TLB entries 44 in the TLB 42 and N shadow memory entries 40 in the shadow memory 34, the mapping circuit 30 resets the counters 36,38 to zero rather than increment them beyond N.

Preferably, steps 64, 66 and 68 are completed together (e.g., atomically) such that the running program, which provided the memory allocation request, does not access the allocated memory until all three steps complete. In particular, critical sections can be used to enable interruptions of the procedure 60 while ensuring correct operation.

In step 70, the mapping circuit 30 deallocates the allocated portion of the memory 16. Accordingly, the allocated portion of the memory 16 returns to a pool of available memory. At this point, any address mapping that mapped the virtual address range selected in step 64 to the portion of the memory 16 becomes stale.

In step 72, the mapping circuit 30 returns to repeat steps 64 through 70 for another memory allocation request unless the mapping circuit 30 receives a signal to terminate operation (e.g., a computer shutdown signal).

It should be understood that, by successively repeating steps 64 through 70, the mapping circuit 30 eventually invalidates every entry 44 in the TLB 42 by the time the counters 36,38 have indexed all of entries in the TLB 42 and the shadow memory 34 (e.g., N).

Furthermore, it is not until the counters 36,38 have indexed all of entries in the TLB 42 and the shadow memory 34 that the mapping circuit 30 reuses a virtual address range from the shadow memory 34. Accordingly, at that time, there is no chance that a stale TLB entry 44 can cause an improper address translation. Rather, the mapping circuit 30 invalidates each TLB entry 44 by the time the mapping circuit 30 reuses a virtual address range (selected from shadow memory entries 40) for a new address mapping thus ensuring that any address mapping, which maps a previously selected address range and which resides in an entry of the translation lookaside buffer, is unavailable for a subsequent address translation. Accordingly, the mapping circuit 30 invalidates every TLB entry 44 prior to reusing a virtual address, but does so by amortizing the TLB accesses required for such an invalidation operation over multiple dynamic mapping operations.

Figure 4A:
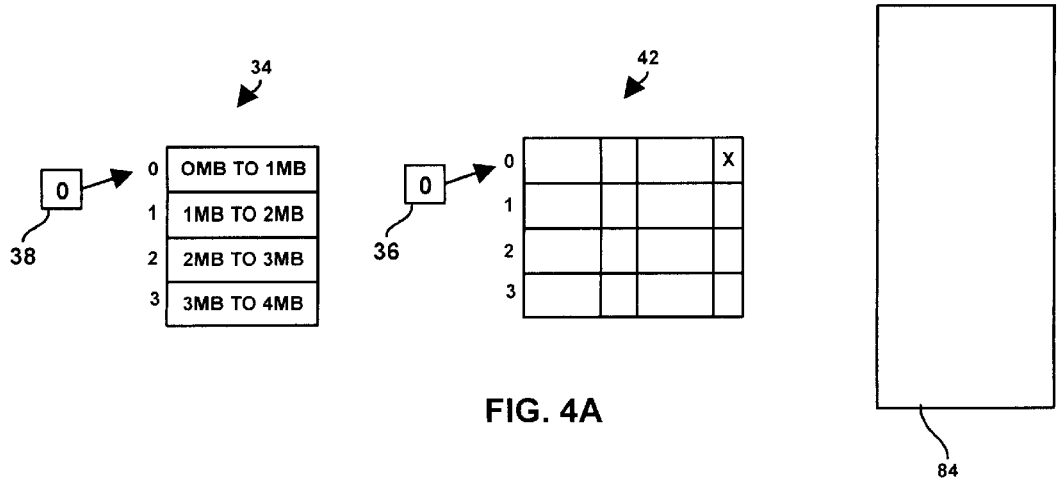
FIGS. 4A–4I are block diagrams further illustrating, by way of example, the operation of the particular circuits of FIG. 2 according to a first embodiment of the invention.

Further details of the invention will now be described using the following example and referencing FIGS. 4A through 4I. In this example, and as shown in FIG. 4A, each of the TLB 42 and the shadow memory 34 includes four entries numbered 0 through 3. At computer start up time, the mapping circuit 30 initializes the shadow memory 34, the TLB counter 36 and the shadow counter 38 (step 62 in FIG. 3). FIG. 4A shows the results of such initialization. In particular, the mapping circuit 30 initializes the entries of the shadow memory 34 with a set of non-overlapping, pre-established 1 MB virtual address ranges, i.e., entry 0 covers 0 MB to 1 MB, entry 1 covers 1 MB to 2 MB, and so on. Additionally, the mapping circuit 30 initializes the TLB counter 36 and the shadow counter 38 by setting their contents to zero.

Next, the mapping circuit 30 services memory allocation and deallocation requests from the operating system 24 (a running program), as the operating system 24 performs successive copy operations using the same virtual address over time. In particular, the operating system 24 copies memory objects such as OBJECT 0 through OBJECT N in FIG. 1. For each copy operation, the operating system 24 sends a memory allocation request to the mapping circuit 30, accesses an allocated portion of the memory 16 received in response to the request, and discards (or frees) the allocated memory portion after completing the copy operation.

For a first memory allocation request from the operating system 24, the mapping circuit 30 selects one of the pre-established virtual address ranges from the shadow memory 34 based on the content of the shadow counter 38, allocates a portion of the memory 16 to the operating system, and stores one or more address mappings in the page tables 25 to map the selected virtual address range to the allocated portion of memory (step 64 in FIG. 3). Since the shadow counter 38 stores zero initially, the mapping circuit selects 0 MB to 1 MB (entry 0) as the virtual address range.

Next, still in response to the first memory allocation request, the mapping circuit 30 accesses at least one entry 44 of the TLB 42, but less than all of the entries 44 of the TLB 42 (step 66 of FIG. 3). In particular, as shown in FIG. 4A, in response to the memory allocation request, the mapping circuit 30 accesses exactly one entry 44 of the TLB 42 by invalidating the entry 44 indexed by the TLB counter 36, namely entry 0 of the TLB 42.

Figure 4B:
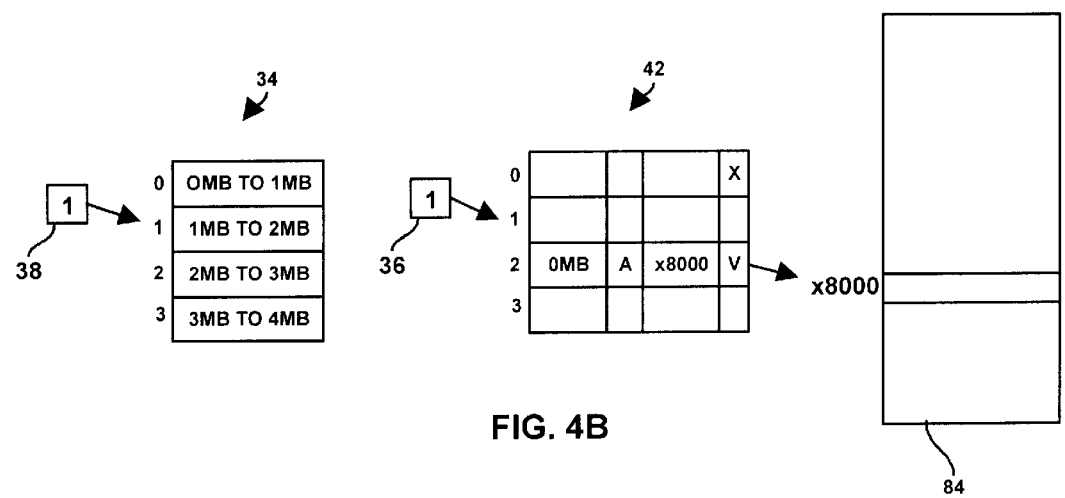

Subsequently, the mapping circuit 30 increments the TLB counter 36 and the shadow counter 38. Accordingly, the contents of the counters are changed from zero to 1. As a result, as shown in FIG. 4B, the TLB counter 36 now indexes TLB entry 1, and the shadow counter 38 now indexes shadow memory entry 1.

At this point, the operating system 24 accesses the allocated memory using a virtual address covered by the selected virtual address range (i.e., 0 MB to 1 MB). The access triggers a TLB exception causing the mapping circuit 30 to transfer a corresponding address mappings from the page tables 25 into the TLB 42. As shown in FIG. 4B, the mapping circuit 30 transfers an address mapping into an available TLB entry 42 (e.g., entry 2), and sets that entry's valid field to indicate that the entry is usable for address translation. By way of example only, the address mapping in entry 2 points to a portion of allocated memory beginning at physical memory location x8000. The operating system 24 then performs a copy operation using this address mapping for address translation.

Later, after the operating system 24 completes the copy operation, the operating system 24 provides the mapping circuit 30 with a memory deallocation request to free the allocated memory. The mapping circuit responds by deallocating that portion of the memory 16 (step 70). The address mapping in entry 2 is now stale. Nevertheless, the mapping circuit 30 allows the stale address mapping to remain unchanged in entry 2 of the TLB 42.

Next, the operating system 24 sends the mapping circuit 30 a second memory allocation request to allocate a portion of memory for another copy operation. The mapping circuit responds by allocating a portion of the memory 16, selecting another virtual address range from the shadow memory 34 based on the contents of the shadow counter 38, and generating one or more new address mappings that map the selected virtual address range to the allocated memory (repeating step 64 of FIG. 3). In particular, as shown in FIG. 4B, the mapping circuit 30 selects the virtual address range 1 MB to 2 MB from entry 1 of the shadow memory 34 since the shadow counter 38 indexes entry 1.

Figure 4C:
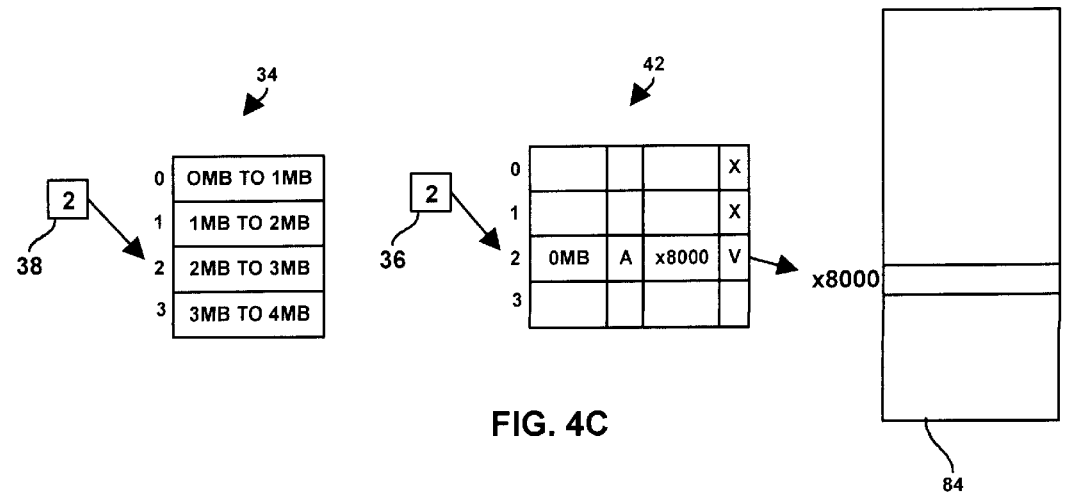

Additionally, in response to this new memory allocation request, the mapping circuit 30 invalidates the entry 44 of the TLB 42 indexed by the TLB counter 36, namely entry 1 (step 66). Furthermore, the mapping circuit 30 increments the TLB counter 36 and the shadow counter 38 (step 68). The results of these operations are shown in FIG. 4C.

Figure 4D:
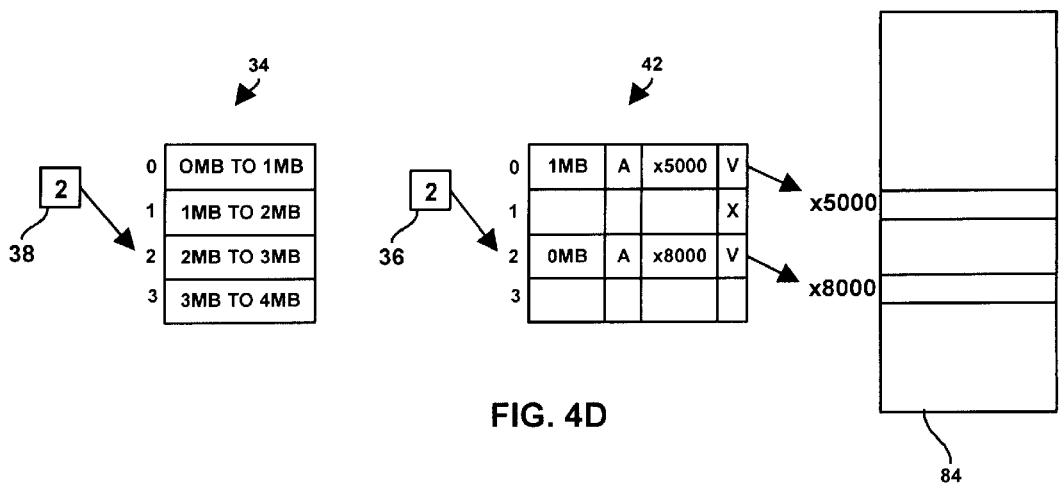

Again, the operating system 24 accesses the allocated memory by first triggering a TLB exception that causes the mapping circuit 30 to load one or more address mappings from the page tables 25. As shown in FIG. 4D, the mapping circuit loads an address mapping into entry 0, and sets the valid field 52 of entry 0, in response to the TLB exception. The operating system 24 accesses the allocated memory using virtual addresses covered by the virtual address range 1 MB through 2 MB to perform the copy operation, and issues a deallocation request to free the allocated memory when the copy operation is complete. In response to the deallocation request, the mapping circuit 30 deallocates the allocated memory (step 70), but allows the stale address mapping in entry 0 of the TLB 42 to remain unchanged.

Figure 4E:
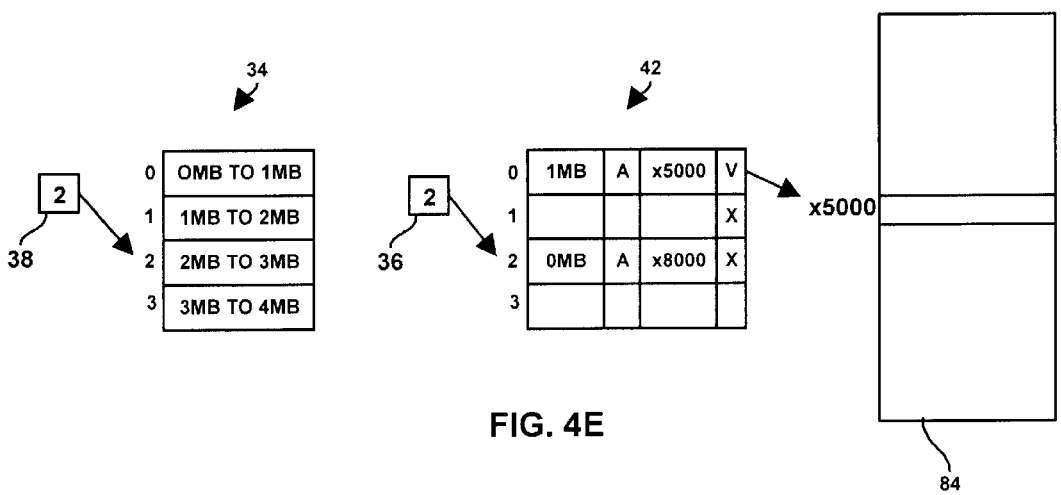
Figure 4F:
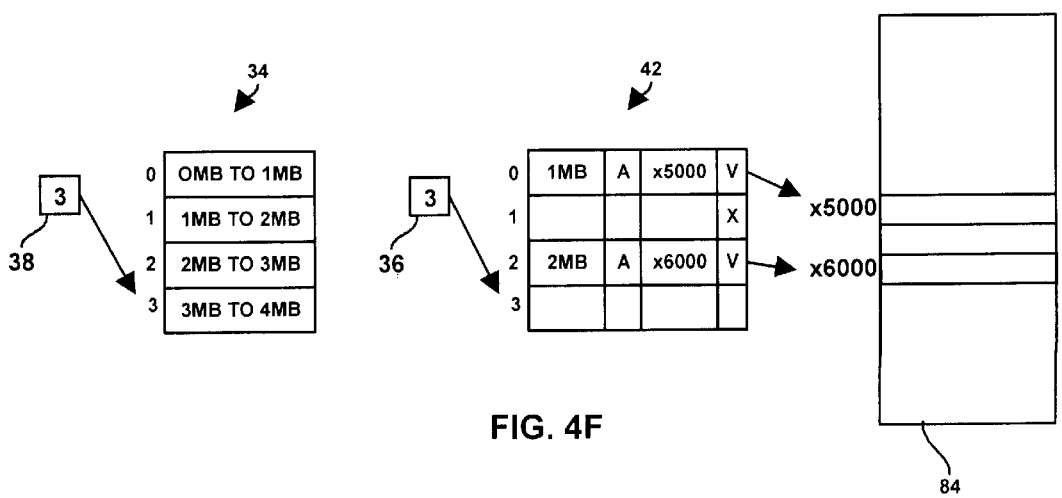

The operating system 24 continues to perform copy operations with assistance from the mapping circuit 30, in the manner described above. In particular, as shown in FIG. 4E, the mapping circuit 30 provides the virtual address range 2 MB to 3 MB from entry 2 of the shadow memory 34 (indexed by the shadow counter 38) in response to the next memory allocation request from the next copy operation (step 64). Additionally, as also shown in FIG. 4E, the mapping circuit 30 invalidates entry 2 of the TLB 42 (indexed by the TLB counter 36) in response to the request (step 66). Furthermore, as shown in FIG. 4F, the mapping circuit increments the TLB counter 36 and the shadow counter 38 such that they point to the next entries (step 68).

Recall that the stale entry having the address mapping used in the first copy operation resided in entry 2 of the TLB 42. When the mapping circuit 30 invalidated entry 2 of the TLB 42, entry 2 became available again. As shown in FIG. 4F, by chance, the operating system's access of the new allocated portion of memory 16 resulted in a TLB exception causing the mapping circuit 30 to load a new address mapping from the page tables 25 into entry 2 of the TLB 42. The operating system 24 later frees the allocated memory, and the mapping circuit deallocates the allocated memory thus making entry 2 stale, again (step 70).

Figure 4G:
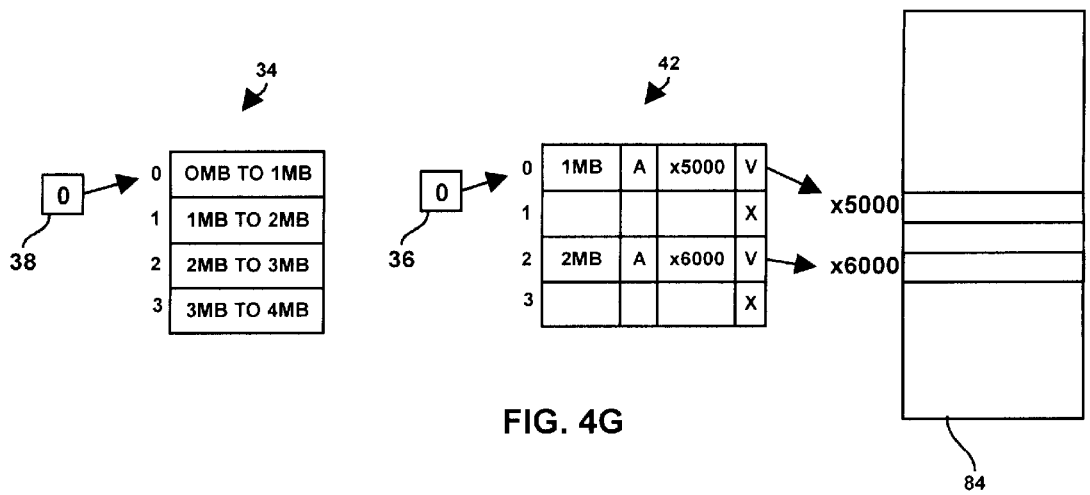

The operating system 24 continues to perform copy operations by requesting allocation of yet another portion of the memory 16. In response, the mapping circuit 30 allocates another portion of memory 16, selects the next indexed virtual address range (namely, 3 MB to 4 MB), and generates address mappings in the page tables 25 to reflect this activity (step 64). Additionally, as shown in FIG. 4G, the mapping circuit 30 invalidates the next indexed TLB entry, namely entry 3 (step 66), and increments the TLB and shadow counters 38,36 (step 68). Here, the mapping circuit 30 increments the TLB and shadow counters 38,36 by resetting them back to zero since they have reached the ends of the TLB 42 and shadow memory 34.

Figure 4H:
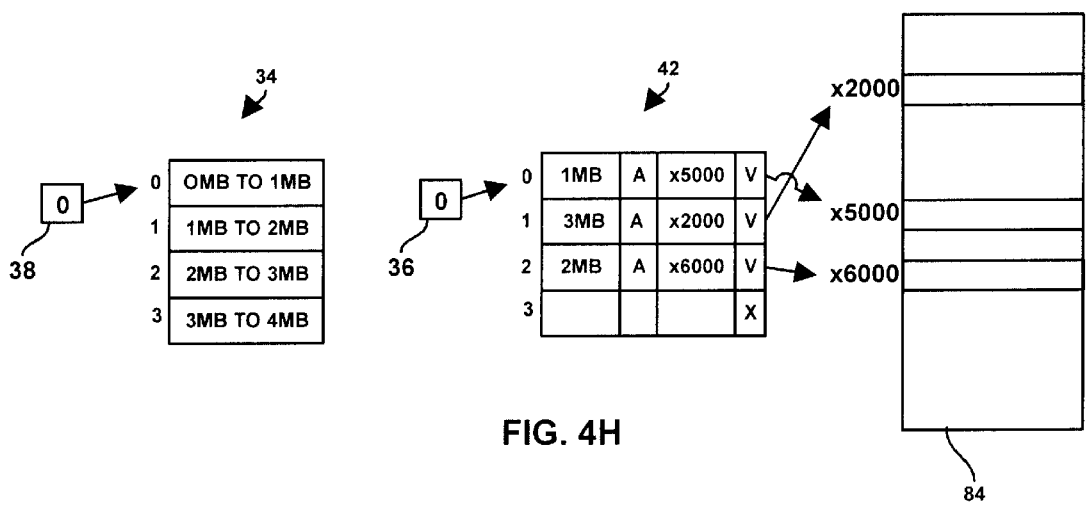

The operating system 24 then triggers a TLB exception when accessing the allocated memory using virtual addresses covered by the newly selected virtual address range. Accordingly, the mapping circuit 30 transfers an address mapping from the page tables 25 into the TLB 42. In particular, as shown in FIG. 4H, the mapping circuit 30 transfers the address mapping into entry 1 of the TLB 42. When the operating system 24 completes the copy operation, the operating system frees the allocated memory, and the mapping circuit 30 responds by deallocating the allocated memory (step 70).

Figure 4I:
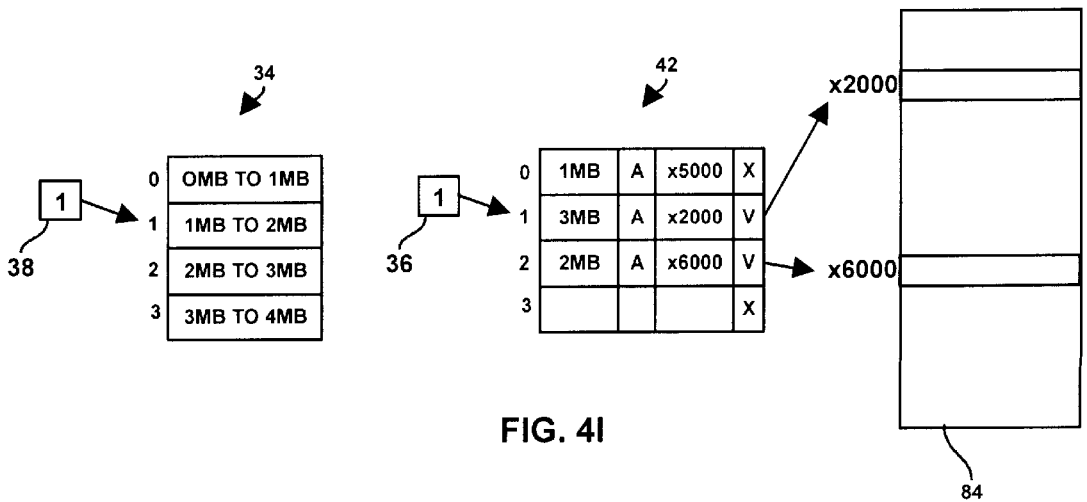

The operating system 24 continues to perform copy operations by requesting another portion of the memory 16. In response, the mapping circuit 30 allocates another portion of the memory 16, selects the next indexed virtual address range (namely, 0 MB to 1 MB), and generates address mappings in the page tables 25 to reflect this activity (step 64). Furthermore, as shown in FIG. 4I, the mapping circuit 30 invalidates the next indexed TLB entry 0 (step 66), and increments the TLB and shadow counters 38,36 (step 68).

It should be understood that, at the point shown in FIG. 4H, the operating system 24 is reusing virtual addresses. That is, the mapping circuit 30 selected the same virtual address range 0 MB through 1 MB because the TLB counter 36 and the shadow counter 38 have each cycled through all of their entries. There is no possibility that an entry 44 within the TLB 42 will cause an improper address translation due to the reuse of the virtual addresses because previous successive steps of invalidating exactly one TLB entry 44 in response to a memory allocation request have resulted in each of the TLB entries 44 being invalidated prior to reusing the virtual addresses. Accordingly, the mapping circuit 30 has effectively amortized the invalidating of the entire TLB 42 over multiple memory allocation requests. In this particular example, the mapping circuit 30 invalidated all four TLB entries by invalidating exactly one TLB entry 44 at each of the four successive memory allocation requests.

Because the computer 10 accesses less than each TLB entry 44 when responding to a dynamic mapping request (e.g., exactly one TLB entry in response to a dynamic mapping request), less TLB operations are required to service the running program that routinely reuses the same virtual addresses to access different memory spaces over time (e.g., the operating system 26 performing memory object copy operations). As such, the computer 10 provides improved performance over conventional approaches that access each TLB entry when responding to a dynamic mapping request. Furthermore, according to the invention, the TLB operations needed to respond to a dynamic request can be kept simple while still guaranteeing proper virtual address to physical address translations. Such features are particularly desirable in data communications devices where simplicity and high performance are generally required.

In a second embodiment, in step 66 in FIG. 3, the mapping circuit 30 invalidates a TLB entry 44 in response to a memory allocation request and stores a new address mapping in the TLB 42, simultaneously. This embodiment provides an additional benefit of invalidating the TLB entry 44 and storing a new address mapping in the TLB 42 in a single TLB access. In a situation where a single address mapping is generated in response to the memory allocation request, and the generated address mapping is stored in the TLB 42 during the single TLB access, a TLB exception is avoided.

Figure 5:
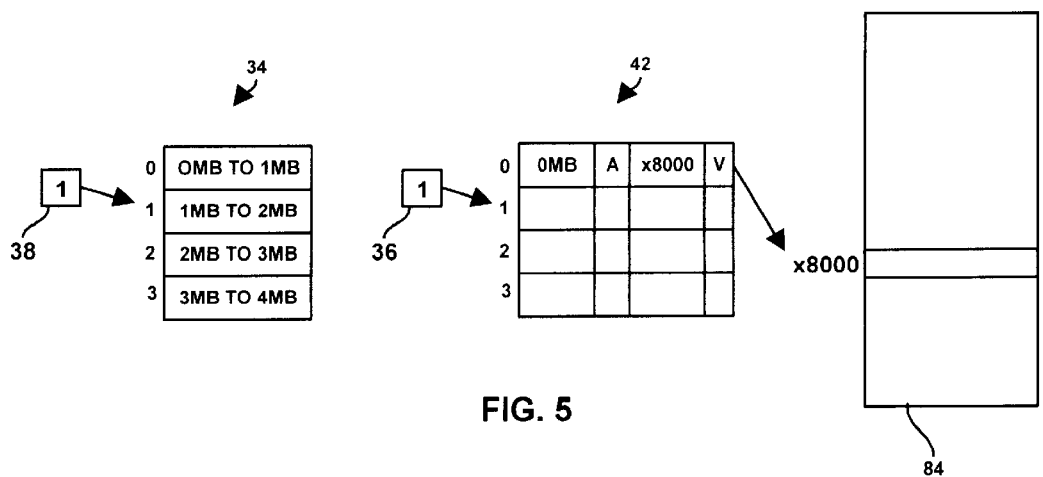
FIG. 5 is a block diagram illustrating, by way of example, a particular step of FIG. 3 according to a second embodiment of the invention.

For the above example, which referenced FIGS. 4A through 4I, the mapping circuit 30 preferably transfers the address mapping associated with the memory allocation request to the TLB 42 as part of step 66 (see FIG. 3). Accordingly, instead of the situation shown in FIG. 4A, the mapping circuit 30 transfers the generated address mapping into the TLB entry 44 that is indexed by the TLB counter 36, as shown in FIG. 5.

In a third embodiment, in step 66 in FIG. 3, the mapping circuit 30 probes a TLB entry 44 in response to a memory allocation request, and invalidates that TLB entry 44 only if it poses a conflict with the virtual address range selected for that memory allocation request. Otherwise, the mapping circuit 30 leaves the TLB entry 44 unchanged.

Figure 6:
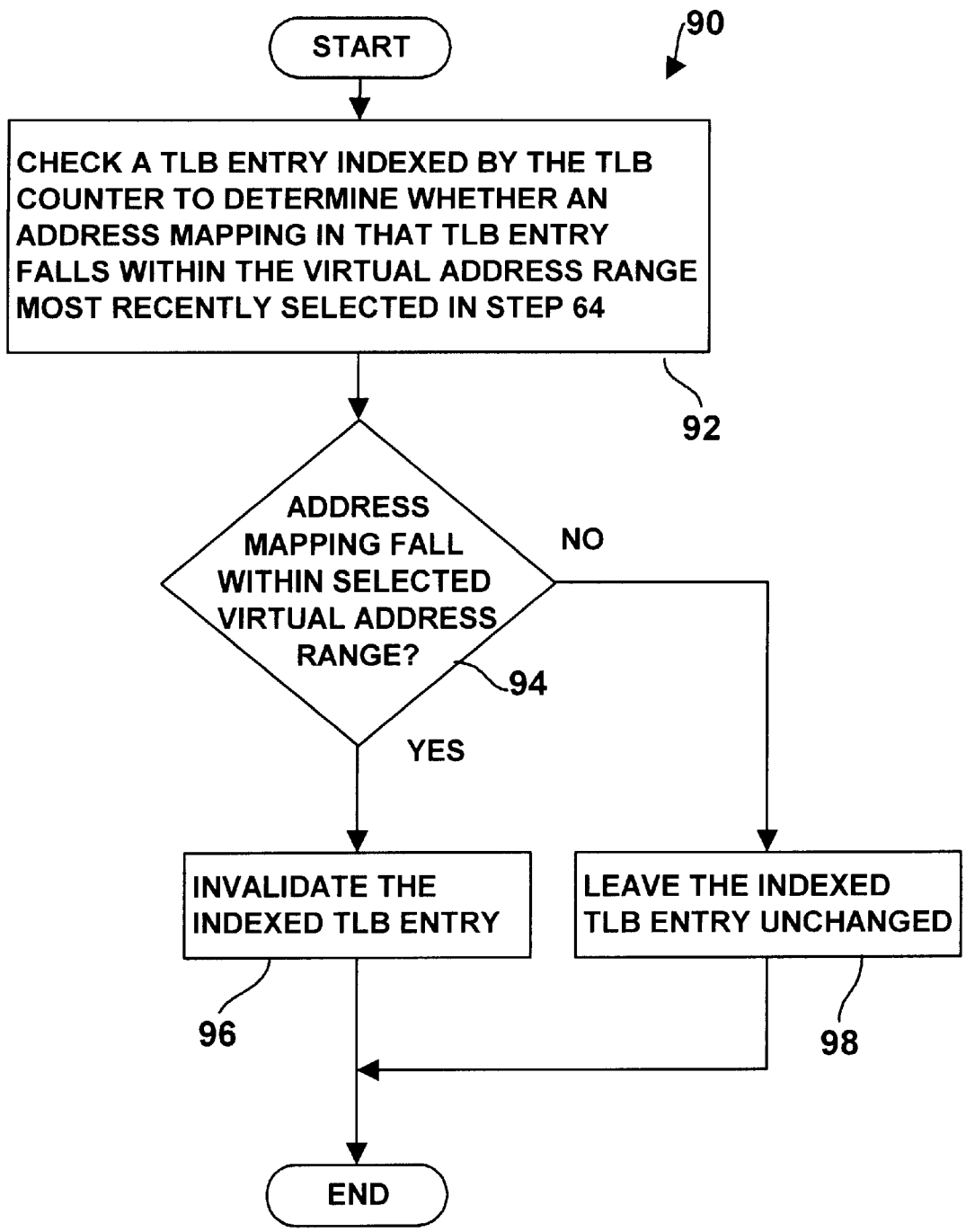
FIG. 6 is a flow chart describing details of a particular step of FIG. 3 according to a third embodiment of the invention.

A procedure 90 for step 66 for the third embodiment is shown in FIG. 6. In step 92, the mapping circuit 30 checks the TLB entry 44 indexed by the TLB counter 36 to determine whether an address mapping in that TLB entry 44 falls within the virtual address range most recently selected in step 64. If so, step 94 proceeds to step 96, in which the mapping circuit 30 invalidates that TLB entry 44. If not, step 94 proceeds to step 98, in which the mapping circuit 30 leaves that TLB entry 44 unchanged.

The third embodiment provides a benefit of not invalidating TLB entries 44 that may still be useful. This reduces the number of TLB exceptions that would otherwise occur if the mapping circuit 30 invalidated those TLB entries 44.

Equivalents

While this invention has been particularly shown and described with references to preferred embodiments thereof, it will be understood by those skilled in the art that various changes in form and details may be made therein without departing from the spirit and scope of the invention as defined by the appended claims.

For example, the computer 10 may function as a data communications device such as a router, switch, hub, bridge, gateway, firewall, proxy server, or other device that transfers data in a network. The operating system 24 running on the computer 10 may include one or more portions of the Cisco IOS manufactured by Cisco Systems of San Jose, Calif.

Moreover, configurations other than that of the computer 10 (see FIG. 1) are suitable for the invention. Some other suitable configurations include multiprocessor arrangements, distributed networked arrangements, and more complex bus arrangements.

Additionally, the memory 16 is not limited to having semiconductor memory as the computer's primary or main memory, and disk memory as the computer's secondary memory. Rather, the memory 16 may further include other memory devices such as CD-ROMs, magnetic tape, cartridge, and memory distributed over a network.

Furthermore, the computer readable medium of the computer program product 28 is not limited to one or more floppy diskettes. Rather, the computer program product 28 may include other devices such as one or more CD-ROMs, tape, or network memory. In these alternative cases, the first I/O device is an interface that is suitable for inputting the specialized code 27 of the operating system 24 from the computer program produce 28 in the proper device format (e.g., a network interface for distributed network memory).

Additionally, the shadow translation table formed by the shadow memory entries 40 can be implemented as an array, stack, heap, linked list, queue or other data structure capable of being indexed. Furthermore, the shadow memory 34 may reside in a location other than the cache 22. For example, the shadow memory 34 may reside in general purpose registers or main memory.

Similarly, the shadow counter 38 and the TLB counter 36 may reside in locations other than general purpose registers. For example, they may reside in the cache 22, main memory, or be implemented as hardware counters or latches. Furthermore, their contents do not necessarily need to be incremented. Rather, these counters 36,38 can cycle through any indexing sequence that enables them to index each entry before indexing an entry a second time. For example, their contents can be decremented rather than incremented.

Additionally, the TLB and shadow counters 36,38 do not need to store simple integer indexes. To the contrary, they can be pointers or offsets to actual memory locations.

Furthermore, the number of entries in the TLB 42 and the shadow memory 34 do not need to match. Rather, there must be at least as many shadow entries (i.e., VA ranges) as TLB entries such that the mapping circuit 30 cycles through the entire TLB 42 by the time it cycles through the entire shadow memory 34. Hence, by the time the mapping circuit 30 re-selects the same virtual address range for use by a running program, the mapping circuit has accessed each entry in the TLB 42.

What is claimed is:

1. In a computer that includes a memory and a translation lookaside buffer having entries for storing address mappings for address translation, a method for reusing addresses, comprising the steps of:

selecting an address range from a set of address ranges in response to a request to allocate a portion of the memory of the computer, and to generate an address mapping which maps that address range to the portion of the memory;

accessing at least one but less than all of the entries of the translation lookaside buffer in response to the request;

deallocating the portion of the memory; and successively repeating the steps of selecting, accessing and deallocating such that, when a repeated step of selecting selects a previously selected address range, previous successive steps of accessing ensure that any address mapping, which maps that previously selected address range and which resides in an entry of the translation lookaside buffer, is unavailable for a subsequent address translation.

2. The method of claim 1 wherein the step of accessing includes the step of:

invalidating exactly one entry of the translation lookaside buffer in response to the request.

3. The method of claim 2, further comprising the steps of:

after the step of selecting the address range from the set of address ranges in response to the request, generating the address mapping which maps that address range to the portion of the memory; and transferring the generated address mapping into an entry of the translation lookaside buffer in response to an exception condition.

4. The method of claim 2 wherein the step of invalidating includes the step of:

transferring, in response to the request, an address mapping into the exactly one entry of the translation lookaside buffer such that the exactly one entry is invalidated.

5. The method of claim 1 wherein the step of accessing includes the steps of:

checking exactly one entry of the translation lookaside buffer to determine whether the exactly one entry includes an address mapping that maps the address range selected by the step of selecting; and invalidating the exactly one entry when the exactly one entry includes the address mapping that maps the address range selected by the step of selecting, and otherwise leaving the exactly one entry unchanged.

6. The method of claim 1 wherein the step of successively repeating includes the step of:

successively accessing the entries of the translation lookaside buffer in a predetermined order.

7. The method of claim 6 wherein the step of successively accessing includes the step of:

indexing the entries of the translation lookaside buffer based on a content of a counter that changes incrementally for each successive access.

8. The method of claim 1 wherein the step of successively repeating includes the step of:

successively selecting the address ranges from the set of address ranges in a predetermined order.

9. The method of claim 8 wherein the step of successively selecting includes the step of:

choosing the address ranges from the set of address ranges based on a content of a counter that changes incrementally for each successive choice.

10. The method of claim 1, further comprising the step of:

before the step of selecting, establishing the address ranges as a pre-defined set of virtual address ranges.

11. A computer system, comprising:

a memory;

a translation lookaside buffer having entries that store address mappings for address translation; and a mapping circuit, coupled to the memory and the translation lookaside buffer, that performs the following operations:

a select operation that selects an address range from a set of address ranges in response to a request to allocate a portion of the memory of the computer, and to generate an address mapping which maps that address range to the portion of the memory, an access operation that accesses at least one but less than all of the entries of the translation lookaside buffer in response to the request, and a deallocate operation that deallocates the portion of the memory, wherein the mapping circuit successively repeats the select, access and deallocate operations such that, when a repeated select operation selects a previously selected address range, previous successive access operations ensure that any address mapping, which maps that previously selected address range and which resides in an entry of the translation lookaside buffer, is unavailable for a subsequent address translation.

12. The computer system of claim 11 wherein the mapping circuit includes:

a control circuit that invalidates exactly one entry of the translation lookaside buffer in response to the request.

13. The computer system of claim 12 wherein the control circuit includes:

circuitry that, after the select operation selects the address range from the set of address ranges in response to the request, (i) generates the address mapping which maps that address range to the portion of the memory, and (ii) transfers the generated address mapping into an entry of the translation lookaside buffer in response to an exception condition.

14. The computer system of claim 12 wherein the control circuit includes:

circuitry that, in response to the request, transfers an address mapping into the exactly one entry of the translation lookaside buffer such that the exactly one entry is invalidated.

15. The computer system of claim 11 wherein the mapping circuit includes:

a control circuit that (i) checks exactly one entry of the translation lookaside buffer to determine whether the exactly one entry includes an address mapping that maps the address range selected by the select operation, and (ii) invalidates the exactly one entry when the exactly one entry includes the address mapping that maps the address range selected by the select operation, and otherwise leaves the exactly one entry unchanged.

16. The computer system of claim 1 wherein the mapping circuit includes:

a translation lookaside buffer counter that provides indexes that change incrementally; and a control circuit, coupled to the translation lookaside buffer counter, that successively repeats the select, access and deallocate operations to successively access the entries of the translation lookaside buffer in a predetermined order according to the indexes provided by the translation lookaside counter.

17. The computer system of claim 11 wherein the mapping circuit includes:

a shadow counter that provides indexes that change incrementally; and a control circuit, coupled to the shadow counter, that successively repeats the select, access and deallocate operations to successively select the address ranges from the set of address ranges in a predetermined order according to the indexes provided by the shadow counter.

18. The computer system of claim 11 wherein the mapping circuit includes:

a shadow memory that stores, as the set of address ranges, pre-defined virtual address ranges; and a control circuit, coupled to the shadow memory, that selects one of the predefined virtual address ranges to perform the select operation.

19. A computer program product that includes a computer readable medium having instructions stored thereon for reusing addresses in a computer, which has a memory and a translation lookaside buffer having entries for storing address mappings for address translation, such that the instructions, when processed by the computer, cause the computer to perform the steps of:

selecting an address range from a set of address ranges in response to a request to allocate a portion of the memory of the computer, and to generate an address mapping which maps that address range to the portion of the memory;

accessing at least one but less than all of the entries of the translation lookaside buffer in response to the request;

deallocating the portion of the memory; and successively repeating the steps of selecting, accessing and deallocating such that, when a repeated step of selecting selects a previously selected address range, previous successive steps of accessing ensure that any address mapping, which maps that previously selected address range and which resides in an entry of the translation lookaside buffer, is unavailable for a subsequent address translation.

20. The computer program product of claim 19 wherein the step of accessing includes the step of:

invalidating exactly one entry of the translation lookaside buffer in response to the request.

* * * * *